United States Patent [19]
Muskulus et al.

[11] 3,811,630
[45] May 21, 1974

[54] COIL WINDING APPARATUS

[75] Inventors: Willi Muskulus, Bergen-Enkheim; Willi Kramer, Bad Vilbel, both of Germany

[73] Assignee: Balzer & Droll KG

[22] Filed: Mar. 22, 1972

[21] Appl. No.: 237,115

[30] Foreign Application Priority Data
   Mar. 23, 1971   Germany.......................... 2113873

[52] U.S. Cl.............. 242/7.11, 140/92.1, 242/7.14, 308/59
[51] Int. Cl........................ H01f 41/06, B21f 3/04
[58] Field of Search ........... 242/7.14, 7.07, 2, 711, 242/3, 7.09; 140/92.1; 308/59, 60

[56] References Cited
UNITED STATES PATENTS

| | | | |
|---|---|---|---|
| 3,578,034 | 5/1971 | Eminger | 140/92.1 |
| 3,575,219 | 4/1971 | Eminger | 140/92.1 |
| 3,106,351 | 10/1963 | Fulton | 242/7.14 |

*Primary Examiner*—Billy S. Taylor
*Attorney, Agent, or Firm*—Larson, Taylor and Hinds

[57] ABSTRACT

A coil winding apparatus having one or more wire guides fixedly mounted on respective spindles which are mounted on a housing for axial movement relative thereto and for rotational movement about their axes. Each spindle includes a main front bearing in the vicinity of its wire guide and a main rear bearing in the housing. The main rear bearings are movable axially with the spindle but the front bearings are shiftable axially relative to the spindle.

12 Claims, 1 Drawing Figure

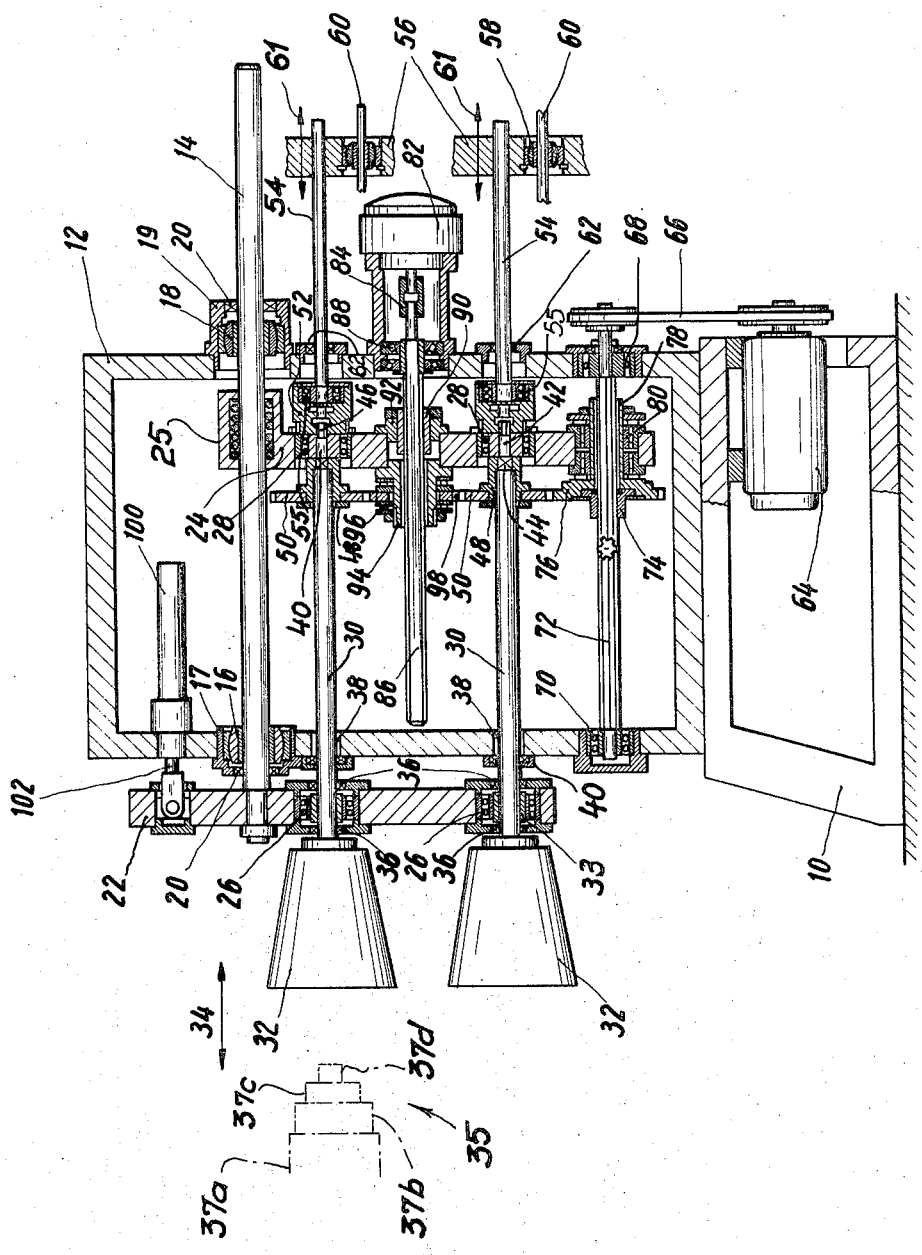

COIL WINDING APPARATUS

BACKGROUND OF THE INVENTION

This invention relates to an apparatus for winding coils for electric machines and the like, and in particular it relates to a new and improved coil winding apparatus of the type in which spindles having wire guides formed at the free end thereof are mounted in a housing for rotational and axial movement relative to a former on which the coils are to be wound.

It is known to wind coils onto formers with devices as shown in U.S. Pat. No. 3,559,699 in which several parallel and synchronously operable wire guides wind coils onto formers having either a constant cross-section or a staggered cross-section with several levels such as shown in U.S. Pat. No. 3,624,898.

More recently, the requirements for precision in the winding of such coils have considerably increased. The windings must be laid on the levels of the former so evenly that there will be no unintentional crossovers. Moreover, the required number of windings for each former or for each level of a former must be maintained with great precision. Therefore, technical problems arise in producing windings with great precision at high speeds.

The winding apparatus known heretofore have been incapable of achieving the requisite precision at high speeds. If the wire guide spindles in the previous apparatus were moved far out from their main front bearings, which bearings had heretofore been held firmly in place in the housing in order to achieve the necessary axial feed, then one could not avoid tumbling movements on the overhung wire guide projecting far out from the front bearing, which resulted in inaccuracies when placing the windings on the former. If on the other hand, the feed movements were carried out by moving the entire drive housing with the spindles, then because of the large masses, the jump or leap of the wire guide from one level of the former to the next would take such a long time that during this transition time it was necessary to brake the rotational movement of the wire guides so that the predetermined number of windings for each level could be achieved. Moreover, the previous constructions had a relatively large amount of inner friction between the parts which were moved with reference to one another during the feeding movement hereby causing the disadvantage of slowing down the leaping movement between the levels of the former. Finally, heretofore the customary drive means for the axial feed movement was provided by one or more power cylinders which were also relatively slow.

Thus, there exists a need for a new and improved arrangement for improving axial movement of a wire guide on a coil winding apparatus which will provide a high degree of precision at high speed operation.

SUMMARY OF THE INVENTION

Thus, it is a purpose of this invention to provide a new and improved coil winding apparatus for electric machines and the like which will overcome the disadvantages in previous coil winding apparatus.

For achieving the above mentioned purpose of assuring a greater precision during winding and high speeds, the proposal is made according to the present invention of providing a winding apparatus of the above described type wherein the front main bearing of the wire guide spindle is slidable in an axial direction with respect to said spindle.

In accordance with a preferred embodiment of the present invention, the front main bearing can support the wire guide spindle immediately behind the wire guide even when said wire guide is moved outwardly a considerable distance from the housing. Just before the wire guide leaps from one level of the former to the next, the front main bearing is pulled back the length of one level so that now the space is free from a leap from one level to the next which is quite rapid because of the relatively small masses involved in the leaping motion. It of course follows that it is possible to wind the former just as well progressing from the closest smallest diameter level to the fartherest largest diameter level by reversing the above procedure. In this case, the wire guide will leap outwardly from the housing to the next larger level on the former after which the front main bearing would be pushed out slowly after it.

For the leaping movement to be as fast as possible, it is important that the parts which are moved during such leaping movement have a small a total mass as possible. This is achieved in part according to the present invention by the arrangement wherein the front main bearing is itself shiftable so that it does not need to participate in the leaping movement because it can be moved slowly either prior to or just after such leaping movements.

In a preferred embodiment of the invention, provision is made for the rear bearing of the wire guide spindle to be axially shiftable with reference to the drive housing while taking said spindle with it. In this manner, as few parts as possible in addition to the essential ones will be accelerated and again braked during the leaping movement. For example, the power means for imparting axial and rotational movement to the spindles and also the housing itself need not be accelerated or decelerated during such leaping movements.

In accordance with another feature of the preferred embodiment of the invention, a disc rotor engine is provided for driving the spindles axially. This type of engine, which is known per se heretofore, has not yet been used in the environment of the present invention. Such an engine is obtainable for example under the designation MV 19 from the firm of CEM PARVEX, Dijon, France, and is excellently suited for the intended purpose since it responds, accelerates and brakes very quickly and also can withstand very frequent switching. In order that the feeding force not create considerable friction, the said motor may be interconnected with the main rear bearings via a screw drive having rolling balls located in the threaded engagement between a shaft turned by the disc rotor engine and a bushing mounted thereon and fixedly connected to the rear main bearings. Such a threaded connection with rolling elements in the grooves is known per se and will not be described in detail herein.

When providing several parallel wire guide spindles, it is very difficult to drill all of the bearing bores precisely parallel to each other. A lack of parallelity and a mistake in the alignment however normally leads to the disadvantage that the edges are squeezed at the bearings which results in considerable friction in the feeding movement of the spindles. When the friction is intermediate, the feed cannot be adjusted in an even manner for all machines. In order to correct this deficiency, the front and rear main bearings are constructed to be swingable about the main axis for self alignment and are preferably ball bearings.

Thus, it is an object of this invention to provide a new and improved coil winding apparatus for coils for electric machines and the like.

It is another object of this invention to provide a new and improved coil winding apparatus which permits a high degree of precision, especially in the leaping movements between levels on a former, even at high speeds.

It is another object of this invention to provide a new and improved coil winding apparatus in which wire guide spindles are mounted in bearings, the front bearing of which is slidable relative to the spindle.

Other objects and the advantages of the present invention will become apparent from the detailed description to follow.

BRIEF DESCRIPTION OF THE DRAWINGS

The accompanying drawing illustrates a preferred embodiment of the invention together with the detailed description to follow.

DETAILED DESCRIPTION OF THE PREFERRED EMBODIMENT

The winding apparatus shown in the figure comprises a lower part 10 of the machine and a drive housing 12 attached on top of it. In it there are mounted two guide bars 14, of which only one is visible in the sectional presentation. Guide bars 14 are mounted axially shiftably in front and rear sliding swing bearings 16 and 18. Packings 20 are provided outside bearings 16 and 18 located in carrying boxes 17 or 19.

At the front end of guide bars 14, a front bearing plate 22 has been attached. Said plate is movable in an axial direction together with guide bars 14. In addition, the latter carries a rear bearing plate 24 mounted in ball bearings 25, which is axially shiftable along guide bars 14. The plates 22 and 24 carry the front and rear main bearings 26 and 28, respectively, for two winding guide spindles 30, on the front ends of which are wire guides, in the present case in the form of winding funnels 32. The winding funnels 32 are connected rigidly with spindles 30 to rotate therewith. During the winding process they must rotate at a very high speed and simultaneously they must carry out axial feed movements in the direction of the arrow 34, so that the wire emerging from an opening at the inside periphery of the winding funnel 32 is wound onto a former 35 which is shown in front of the upper winding funnel 32. The former 35 contains several levels 35a–37d with varying diameters. At the beginning of the winding process they are in aligned opposition to the winding funnels 32. The winding funnels 32 then move into their forwardmost position, fartherest to the left in the figure, and start winding the rearmost level 37a of former 35 evenly, which level has the largest diameter. While the wire is wound onto the former, the winding funnels 32 move slowly to the right. When the wire arrives at the end of the level 37a a feed leap takes place to the right across the transition to the next level 37b of the former. Then the latter is wound while winding funnel 32 is pulled farther back to the right. At the end of the second level 37b a leap-like transition again takes place to the right to level 37c, the level 37c then being continuously wound toward the right and so forth. In order that one winding will be placed neatly beside the other onto the former without any crossovers taking place, it will be necessary to mount the spindle 30 with its funnel 32 very precisely in the position which is fartherest toward the left. In order that the rotational speed of the spindles 30 will not have to be reduced -- or have to be reduced only insignificantly during the leap from one level to the next, so that all levels will receive their predetermined number of windings, it is necessary to carry out the axial feed leap from one level to the next as rapidly as possible. These conditions are fulfilled in the case of the winding apparatus described herein.

The front main bearings 26 of the spindle 30 have been developed as sliding-swing bearings with an inside slide box 33, which permits an axial shifting of the spindles 30 through the bearings 26. At both sides of bearings 26 there are packings 36. In front of the openings of passages 38 of the spindle 30 in housing 12, packings 40 also have been attached.

The rear main bearings 28 likewise are sliding swing bearings. While the outside ring of each of these bearings is always seated in a fitting bore of bearing plate 24, the inside ring of the bearing is fitted onto a tapered section 42 of the spindle 30, which section is located between a section 44 of square cross-section and the screw threaded end 46 of spindle 30. The square section 44 constitutes a rotationally fixed connection with a bushing 48 seated on the spindle 30, which bushing is fixedly connected for rotation with a gear 50. Another bushing 52 is screwed onto threaded end 46 of the spindle 30 which bushing holds bearing 55 and the inside bearing ring of the bearing 28 on spindle 30.

The coil wire is carried through the spindles 30 to the winding funnels 32. The conveyance of the wire from behind the drive housing 12 into housing 12 and spindles 30 is accomplished via nonrotating pipes 54, the front ends of which are mounted in self-aligning ball bearings 55 held in bushing 52, while the rear ends are seated in guide plates 56 which are shiftable in an axial direction as indicated by arrows 61, which are shiftable on sliding-swing bearings 58 along small guide bars 60 which are fixed on housing 12. Packings 62 are provided at the openings of pipes 54 through the wall of the housing. An additional packing is provided beside each bearing 55 in its bushings 52, so that no oil can enter inside into The rotary drive of the spindles 30 takes place by means of an electric motor 64 mounted on base portion 10. This motor will drive a splined shaft 72 mounted in housing 12 in ball bearings 68 and 70 via a serrated drive belt 66. A short bushing 74 provided with a bore of spline profile matching the spline profile of shaft 72 slides on shaft 72. This bushing 74 is fixedly connected with a gear 76, the hub 78 of which is relatively long, and is mounted in the bearing plate 24 with the aid of two radial and axial roller or needle bearings. For simplicity, the entire axial and radial bearing mounting arrangement of the hub 78 of the gear is designated by 80. The central bore of hub 78 is large enough so that spline shaft 72 can be guided freely through it. Therefore, only bushing 74 and not also hub 78 will turn with spline shaft 72.

The feed drive is accomplished by means of an electric disc runner engine 82 of the type mentioned above which is flanged onto housing 12 and which is connected via a coupling 84 with a threaded ball rotating spindle 86. The latter is mounted on the one hand at its rear end in housing 12 via tapered roller bearings 88, and on the other hand it is received in a nut 90 which is connected to bearing plate 24 via a flange bushing 92. Inside nut 90, balls, which are not shown, circulate in the thread between said nut and spindle 86. Such ball rotary spindle and nut means are well known and need not be described in greater detail here.

In front of nut 90 and coaxially with without a flanged bushing 94 is firmly attached to bearing plate 24 and carries a gear 98 freely rotatable on a radial bearing. The mounting arrangement is designated altogether by 96 and between two axial bearings it is developed as an antifriction bearing. The bore of the flange bushing 94 is large enough that the ball rotating spindle 86 can be guided therethrough without making contact. The gear 98 is an idler between the two gears 50, of which only one meshes with gear 76.

The disc runner engine 82 moves rear bearing plate 24 via the ball rotating spindle 86 and the pertinent nut 90, which plate 24 drives axially the spindles 30 and gears 50, 76 and 98. The front bearing plate 22 is shifted axially independently of the last mentioned parts. As a drive for the front bearing plate 22 there is provided a power cylinder 100 attached to housing 12, the piston rod 102 of which projects forward and is connected articulately with bearing plate 22.

Whenever the funnels 32 are pushed forward to the left into their extreme position, therefore, at the beginning of the winding process, the front bearing plate 22 is pushed forward to such a point that the funnels 32 can still leap back from the first level 37a to the second level 37b of the former 35 without abutting against bearing plate 22. During the winding of the second level 37b, the front bearing plate 22 then is pulled back by means of power cylinder 100, independently of the feed movement of the funnels 32, by the length of one level, so that the funnels 32 can leap back unimpeded from the second level 37b to the third level 37c, etc. It is clear that the front main bearings 26 in every position of the funnels 32 will guide the spindles 30 right behind said funnels without impeding the axial movement of the funnels 32. The leap-like movement during the feed takes place very quickly, since the moved masses are small and the friction resulting from the edges of the bearings being squeezed is decreased to the very minimum as a result of the use of sliding-swing bearings.

Although the invention has been described in considerable detail with respect to a preferred embodiment thereof, it will be apparent that this invention is capable of numerous modifications and variations apparent to those skilled in the art without departing from the spirit and scope of the invention.

We claim:

1. An apparatus for winding coils for electric machines and the like comprising:
   a housing,
   a wire guide, means for fixedly mounting the wire guide on an elongated spindle,
   means for mounting said spindle on said housing for rotational and axial movement relative thereto, said mounting means including a front rotary bearing which includes means for mounting the spindle in the vicinity of the wire guide and a rear rotary bearing which includes means for mounting the spindle rearwardly of the said front bearings,
   and said front bearing mounting means including means for permitting shifting of the front bearing axially relative to said spindle and relative to said housing so that the front bearing can be moved towards and away from the wire guide of the spindle for given axial positions of the spindle.

2. An apparatus according to claim 1, including means mounting said spindle and said rear bearings for common movement together axially of said spindle in said housing.

3. An apparatus according to claim 2, including rotary drive means for rotating said spindle and means mounting said spindle and said rear bearing for axial movement relative to said rotary drive means.

4. An apparatus according to claim 2, including means for rotating the spindle and means for moving the spindle axially.

5. An apparatus according to claim 4, said means for rotating comprising a spindle gear fixedly connected to the spindle and a drive gear drivingly engaging the spindle gear and means mounting the drive gear for movement in a direction parallel to the spindle axis such that driving engagement is maintained between the drive gear and the spindle gear at all axial positions of the spindle.

6. An apparatus according to claim 5, said means for moving the spindle axially including a screw threaded shaft rotatably mounted in the housing and a screw threaded nut threaded onto the shaft and fixed thereto for axial movement with the shaft, whereby rotation of the shaft causes axial movement of the spindle.

7. An apparatus according to claim 6, including a front bearing plate, said front bearing being mounted in said front bearing plate, and power means for moving said front bearing plate and hence said front bearing relative to said housing.

8. An apparatus according to claim 5, including a splined drive shaft fixed for rotation in the housing but prevented from moving axially therein, said drive gear mounted on the spinle shaft for rotation therewith and for axial sliding movement therealong.

9. An apparatus according to claim 1, including means for positioning said front main bearing between the outside of the housing and the wire guide.

10. An apparatus according to claim 1, including means for positioning said front main bearing between the outside of the housing and the wire guide.

11. An apparatus according to claim 1, including a plurality of said spindles, each having a said wire guide and said front and rear bearings, a front bearing plate mounting all said front bearings and located between the wire guides and the housing, and a rear bearing plate mounting all said rear bearings and located in the housing.

12. An apparatus according to claim 11, including rotating means for rotating the spindles and axial means for moving the spindles axially, both said rotating means and said axial means connected to the spindles through means connected to the rear bearing plate, and a guide bar mounted in the housing for guiding the front bearing plate axially.

* * * * *